US006464770B1

(12) United States Patent
Palm et al.

(10) Patent No.: US 6,464,770 B1
(45) Date of Patent: Oct. 15, 2002

(54) PERLITE PRODUCTS WITH CONTROLLED PARTICLE SIZE DISTRIBUTION

(75) Inventors: Scott K. Palm, Santa Barbara, CA (US); Bo Wang, Lompoc, CA (US); Christopher Hayward, Santa Maria, CA (US); John S. Roulston, Lompoc, CA (US)

(73) Assignee: Advanced Minerals Corporation, Santa Barbara, CA (US)

( * ) Notice: Subject to any disclaimer, the term of this patent is extended or adjusted under 35 U.S.C. 154(b) by 0 days.

(21) Appl. No.: 09/635,214

(22) Filed: Aug. 8, 2000

(51) Int. Cl.[7] .......................... C08K 7/26; B01D 24/00; B01D 39/06

(52) U.S. Cl. .............................. 106/409; 106/DIG. 2; 252/378 P; 210/807; 210/502.1

(58) Field of Search ........................ 106/409, DIG. 2; 252/378 P; 210/807, 502.1

(56) References Cited

U.S. PATENT DOCUMENTS

| | | | |
|---|---|---|---|
| 2,431,884 A | | 12/1947 | Neuschotz |
| 2,602,782 A | | 7/1952 | Zoradi |
| 3,233,740 A | * | 2/1966 | Vander Linden et al. ........................ 252/378 P |
| 3,915,735 A | | 10/1975 | Moreland |
| 4,260,498 A | | 4/1981 | Sample, Jr. et al. |
| 4,617,128 A | | 10/1986 | Ostreicher |
| 4,686,253 A | | 8/1987 | Struss et al. |
| 5,035,804 A | | 7/1991 | Stowe |
| 5,776,353 A | | 7/1998 | Palm et al. |
| 5,908,561 A | | 6/1999 | Palm et al. |

FOREIGN PATENT DOCUMENTS

| | | |
|---|---|---|
| DE | 10 57 577 B | 5/1959 |
| EP | 0 119 411 A2 | 9/1984 |
| EP | 0 119 411 A3 | 5/1987 |
| SU | 929 164 B | 5/1982 |

OTHER PUBLICATIONS

Bear, Jacob (1988). "Derivations of Darcy's Law" in Chapter 5 "The Equation of Motion of a Homogeneous Fluid" in *Dynamics of Fluids in Porous Media*, 2nd edition, (Dover Publications, Inc., New York) pp. 161–176.
Berry, L.G. and Mason, Brian (1983). Part IV. Appendixes, "Appendix A. Natural glasses and macerals" in *Mineralogy* (New York: Freeman and Co.) pp. 540–546.
Breese, Richard O.Y. and Barker, James M. (1994). "Perlite" in *Industrial Minerals and Rocks* (Society for Mining, Metallurgy, and Exploration, Inc., Littleton, Colorado) 6th Edition, pp. 735–749.
Cain, C.W., Jr. (1984). "Filter aid, use in filtration" Chapter 21, "Expanders to Finned Tubes, Selection of" in *Encyclopedia of Chemical Processing and Design* (New York: Marcel Dekker, Inc.) pp. 348–372.
Derwent Abstract of SU 929 164 B (Jan. 3, 1983).
Derwent Abstract of EP 0 119 411 A2 (Mar. 5, 1984).

Carman, P. C. (1937) no month prouded. "Fluid flow through granular beds" *Trans.–Institution of Chem. Eng.* pp. 150–166.
Heertjes, P. M. and H. v.d. Haas (1949) no month prouded. "Studies in filtration. Part I" *Recueil* 68:361–383.
Heertjes, P. M. and Lerk, C. F. (1966) no month provided. "Filter blocking, filter media and filter aids" Chapter 2 in *Solid–Liquid Separation* (London: Her Majesty's Stationery Office), pp. 37–43.
Hermanson, Greg T. et al. (1992) no month provided. *Immobilized Affinity Ligand Techniques* (San Diego: Academic Press Inc.) (Table of Contents).
Kadey, Frederic L., Jr. (1983) no month provided. "Diatomite" in *Industrial Minerals and Rocks* (Nonmetallics other than Fuels) (Society of Mining Engineers of the American Institute of Mining, Metallurgical, and Petroleum Engineers, Inc., New York, New York) Fifth Edition, vol. 1, pp. 677–708.
Kiefer, J. (IV/1991) no month provided. "Kieselguhr filtration" *Brauwelt International* pp. 300–302, 304–309.
Nordén, Harry V. and Kauppinen, Petteri (1994) no month provided. "Application of volume balances and the differential diffusion equation to filtration" *Separation Science and Technology* 29(10): 1319–1334.
Ruth, B. F. (1946) no month provided. "Correlating filtration theory with industrial practice" *Industrial and Engineering Chemistry* 38(6):564–571.
Sperry, D. R. (1916) no month provided. "The principles of filtration" *Metallurgical and Chemical Eng.*, vol. XV(4):198–203.
Stein, H. A. and Murdock, J. B. (1955) no month provided. "The processing of perlite" *California Journal of Mines and Geology, State of California Division of Mines* 51(2):105–116.
Tiller, F. M. (1953) no month provided. "The role of porosity in filtration. Numerical methods for constant rate and constant pressure filtration based on Kozeny's law" *Chemical Engineering Progress* 49(9):467–479.
Tiller, F. M. and Cooper, Harrison (1962) no month provided. "The role of porosity in filtration: Part V. Porosity variation in filter cakes" *A.I.Ch.E. Journal* 8(4):445–449.
Tiller, F. M. and Shirato, Mompei (1964) no month provided. "The role of porosity in filtration: VI. New definition of filtration resistance" *A.IChE. Journal* 10(1):61–67.
Trivedi, Nikhil C. and Hagemeyer, Robert W. (1994) no month provided. "Fillers and coatings" in *Industrial Minerals and Rocks* (Society for Mining, Metallurgy, and Exploration, Inc., Littleton, Colorado) 6th Edition, pp. 483–495.

* cited by examiner

*Primary Examiner*—David Brunsman
(74) *Attorney, Agent, or Firm*—Morrison & Foerster LLP

(57) ABSTRACT

Expanded perlite products having controlled particle size distribution, methods of producing the expanded perlite products, and methods of use thereof are provided. The expanded perlite product has, for example, a low ratio of standard deviation of particle size distribution to median particle size (for example, less than 0.63) and low median particle size (for example, less than 50 microns). The expanded perlite product may be used in a variety of applications including filter applications.

26 Claims, 1 Drawing Sheet

PERLITE PRODUCTS WITH CONTROLLED PARTICLE SIZE DISTRIBUTION

TECHNICAL FIELD

This invention relates to a siliceous perlite product having controlled particle size distribution, which is useful in filter and filler applications.

BACKGROUND ART

Throughout this application, various publications, patents, and published patent applications are referred to by an identifying citation; full citations for these documents may be found at the end of the specification. The disclosure of the publications, patents, and published patent specifications referred in this application are hereby incorporated by reference into the present disclosure.

Many methods for the separation of particles from fluids employ cellular or porous siliceous media, such as diatomite or perlite, as filter aids (Bear, 1988; Cain, 1984; Carman, 1937; Heertjes, 1949, 1966; Ruth, 1946; Sperry, 1916; Tiller, 1953, 1962, 1964).

Perlite products have been prepared by milling, screening, and thermal expansion. Depending on the quality of the perlite ore and the method of processing, expanded perlite products have been used as filter aids, lightweight insulating materials, filler materials, horticultural and hydroponic media, and chemical carriers; expanded perlite has been used in filtration applications since about the late 1940's (Breese and Barker, 1994). Expanded perlite is also used as an absorbent for treating oil spills (e.g., Stowe, 1991).

Conventional processing of perlite consists of comminution of the ore (crushing and grinding), screening, thermal expansion, milling, and air size separation of the expanded material to meet the specification of the finished product. For example, perlite ore is crushed, ground, and separated to a predetermined particle size range (e.g., passing 30 mesh), then the separated material is heated in air at a temperature of 870–1100° C. in an expansion furnace (cf. Neuschotz, 1947; Zoradi, 1952), where the simultaneous softening of the glass and vaporization of contained water leads to rapid expansion of glass particles to form a frothy glass material with a bulk volume up to 20 times that of the unexpanded ore. The expanded perlite is then air separated to meet the size specification of the final product. The expanded perlite product may further be milled and separated for use as filter aid or filler material (Breese and Barker, 1994). Some degree of separation after expansion is common, for example, using cyclones, which are simple conical devices that separate particles according to their aerodynamic mass by suspending them in a stream of air. Stein (1955) states that two or more cyclones in series are sometimes used, the first cyclone having lower efficiency than the following ones, so as to air-separate the product into several size fractions.

Expanded perlite products have found widespread utility in filtration applications. The principles of filtration using porous media have been developed over many years (Carman, 1937; Heertjes, 1949, 1966; Ruth, 1946; Sperry, 1916; Tiller, 1953, 1962, 1964), and have been recently reviewed in detail from both practical perspectives (Cain, 1984; Kiefer,1991) as well as from their underlying theoretical principles (Bear, 1988; Norden, 1994).

Perlite products are applied to a septum to improve clarity and increase flow rate in filtration processes, in a step sometimes referred to as "precoating." Perlite products are also added directly to a fluid as it is being filtered to reduce the loading of undesirable particulate at the septum while maintaining a designed liquid flow rate, in a step often referred to as "body feeding". Depending on particular separation involved, perlite products may be used in precoating, body feeding, or both. Perlite products, especially those which are surface treated, can enhance clarification or purification of a fluid (Ostreicher, 1986). Expanded perlite products are often used as insulating fillers, resin fillers, and in the manufacture of textured coatings (Breese and Barker, 1994).

Particle size has strong effect on both filter aid and filler applications. The selection of the proper grade of filter aid depends on the size of the suspended particles that are to be removed. It is axiomatic in the use of filter aids that as the filter aid particle size and the liquid flow rate increase, the ability of the filter aid to remove small particles of suspended matter decreases (Kadey, 1983). Conversely, as filter aid particle size and liquid flow rate decrease, the ability of the filter aid to remove small particles of suspended matter increases. The performance of fillers is also closely related to the particle size. Particle size effects result from the average size, the top size, and the size distribution. For example, in a paint system, the average size of a filler may affect viscosity and binder demand, the size distribution may affect packing and resultant density and film integrity, and the top size may affect paint gloss/sheen and smoothness, or cause fracture failures or cracking (Trivedi and Hagemeyer, 1994).

The as-expanded perlite normally contains a significant amount of light-weight material called floaters, which are expanded perlite particles that often contain entrapped air. As the name suggests, floaters quickly float to the surface of liquid rather than remain buoyantly suspended in it. The floater content has a negative effect on filter aid and filler applications because they often float away from their intended functional location, for instance, either away from the filter septum or away from a desired location within a filler system. Therefore, floaters should be minimized during the processing of perlite for many applications.

Color is also important for a filler in any application, especially where color of the end product is important. Whiter filler products with high blue light brightness normally have greater utility, as they can be used in all colored and white products and, relative to non-white fillers, reduce the demand for expensive white pigments, such as titanium dioxide. For these reasons, perlite products with controlled particle size distribution, low floater content, and high blue light brightness are often desirable.

The particle size distribution, floater content and blue light brightness of commercially available expanded perlite products, measured using the standard methods described below, are shown in Table I. The lowest median particle size ($d_{50}$) for the product having a ratio of the standard deviation of particle size distribution to the median particle size ($sd/d_{50}$) less than 0.63 is 53 microns (sometimes abbreviated "$\mu$"; i.e., $\mu$m, or micrometer). The lowest floater content for the product having a ratio of the standard deviation of particle size distribution to the median particle size ($sd/d_{50}$) less than 0.63 is 10 percent by volume.

TABLE 1

| Product | Manufacturer | $d_{50}$ ($\mu$m) | sd ($\mu$m) | sd/$d_{50}$ | Floater (%) | Blue light Brightness | Wet Density (lb/ft$^3$) |
|---|---|---|---|---|---|---|---|
| Harborlite ® 2000 | Harborlite Corp. | 58.84 | 35.52 | 0.60 | 22 | 83 | * |
| Harborlite ® 1950S | Harborlite Corp. | 62.40 | 39.13 | 0.63 | 12 | 73 | * |
| Harborlite ® 1900S | Harborlite Corp. | 54.94 | 34.22 | 0.62 | 12 | 71 | * |
| Harborlite ® 1500S | Harborlite Corp. | 52.64 | 33.64 | 0.64 | 12 | 69 | * |
| Harborlite ® 1500 | Harborlite Corp. | 50.45 | 32.24 | 0.64 | 14 | 81 | * |
| Harborlite ® 900S | Harborlite Corp. | 54.00 | 35.97 | 0.67 | 10 | 70 | * |
| Harborlite ® 900 | Harborlite Corp. | 44.37 | 29.52 | 0.67 | 10 | 82 | * |
| Harborlite ® 800 | Harborlite Corp. | 39.69 | 26.97 | 0.68 | 10 | 81 | * |
| Harborlite ® 700 | Harborlite Corp. | 38.66 | 26.62 | 0.69 | 10 | 81 | * |
| Harborlite ® 635 | Harborlite Corp. | 25.30 | 18.46 | 0.73 | <2 | 79 | 12.9 |
| Harborlite ® 500 | Harborlite Corp. | 44.15 | 31.66 | 0.72 | 8 | 76 | 14.5 |
| Harborlite ® 475 | Harborlite Corp. | 28.50 | 21.22 | 0.74 | <2 | 77 | 13.6 |
| Harborlite ® 400 | Harborlite Corp. | 36.55 | 28.26 | 0.76 | <2 | 76 | 13.9 |
| Harborlite ® 300C | Harborlite Corp. | 18.75 | 15.95 | 0.85 | <2 | 80 | 17.1 |
| Harborlite ® 200Z | Harborlite Corp. | 19.18 | 16.18 | 0.84 | <2 | 75 | 15.4 |
| Harborlite ® 200 | Harborlite Corp. | 21.85 | 18.12 | 0.83 | <2 | 75 | 19.2 |
| Europerlita ™ 1500 | Europerlita Espanola, S.A. | 52.69 | 36.03 | 0.68 | 18 | 74 | * |
| Europerlita ™ 900 | Europerlita Espanola, S.A. | 49.59 | 32.52 | 0.66 | 18 | 72 | * |
| Europerlita ™ 700 | Europerlita Espanola, S.A. | 46.45 | 33.03 | 0.71 | 18 | 71 | * |
| Europerlita ™ 475 | Europerlita Espanola, S.A. | 37.93 | 27.45 | 0.72 | 10 | 71 | * |
| Europerlita ™ 400 | Europerlita Espanola, S.A. | 22.91 | 20.64 | 0.90 | <2 | 76 | 14.3 |
| Europerlita ™ 350 | Europerlita Espanola, S.A. | 18.13 | 16.22 | 0.89 | <2 | 74 | 17.8 |
| Europerlita ™ 75 | Europerlita Espanola, S.A. | 15.98 | 16.39 | 1.02 | <2 | 70 | 17.6 |
| Dicalite ™ 416 | Grefco, Inc. | 12.02 | 15.84 | 1.32 | 6 | 77 | 19.5 |
| Dicalite ™ 426 | Grefco, Inc. | 23.91 | 25.24 | 1.06 | 10 | 82 | * |
| Dicalite ™ 476 | Grefco, Inc. | 49.93 | 33.91 | 0.68 | 34 | 80 | * |
| Dicalite ™ 419 | Grefco, Inc. | 46.89 | 31.43 | 0.67 | 28 | 81 | * |
| Clarcel Flo ™ 2A | Ceca S.A. | 53.05 | 33.85 | 0.64 | 10 | 71 | * |
| Randalite ™ W9 | Winkelmann Materaria S.r.L. | 33.90 | 25.68 | 0.76 | 6 | 73 | 16.6 |
| Randalite ™ W12 | Winkelmann Materaria S.r.L. | 42.35 | 31.02 | 0.73 | 10 | 78 | * |
| Randalite ™ W19 | Winkelmann Materaria S.r.L. | 43.04 | 31.79 | 0.74 | 14 | 73 | * |
| Randalite ™ W24 | Winkelmann Materaria S.r.L. | 45.21 | 30.49 | 0.67 | 10 | 80 | * |
| Randalite ™ W28 | Winkelmann Materaria S.r.L. | 53.81 | 36.21 | 0.67 | 34 | 77 | * |
| Randalite ™ W32 | Winkelmann Materaria S.r.L. | 63.44 | 40.29 | 0.64 | 20 | 76 | * |
| Topco ™ #54 | Showa Chemical Industry Co., Ltd | 5.47 | 5.769 | 1.05 | <2 | 76 | 20.8 |
| Topco ™ #51 | Showa Chemical Industry Co., Ltd | 34.27 | 26.65 | 0.78 | 8 | 78 | 13.9 |
| Topco ™ #31 | Showa Chemical Industry Co., Ltd | 37.96 | 30.99 | 0.82 | 12 | 75 | * |
| Topco ™ #34 | Showa Chemical Industry Co., Ltd | 39.74 | 31.42 | 0.79 | 16 | 78 | * |
| Topco ™ #36 | Showa Chemical Industry Co., Ltd | 44.33 | 33.71 | 0.76 | 16 | 76 | * |
| Topco ™ #38 | Showa Chemical Industry Co., Ltd | 45.56 | 32.48 | 0.71 | 20 | 77 | * |
| Roka Help ™ #419 | Mitsui Mining & Smelting Co., Ltd | 19.29 | 18.29 | 0.95 | <2 | 77 | 13.0 |
| Roka Help ™ #479 | Mitsui Mining & Smelting Co., Ltd | 39.43 | 29.95 | 0.76 | 14 | 73 | * |
| Roka Help ™ #4159 | Mitsui Mining & Smelting Co., Ltd | 47.52 | 32.43 | 0.68 | 24 | 77 | * |
| SM 101 | Samson Co., Ltd. | 11.60 | 12.00 | 1.03 | <2 | 75 | 17.1 |
| SM 201 | Samson Co., Ltd | 17.87 | 14.35 | 0.80 | <2 | 81 | 11.3 |
| SM 441 | Samson Co., Ltd | 37.03 | 28.62 | 0.77 | 16 | 79 | * |
| SM 501 | Samson Co., Ltd | 52.21 | 34.86 | 0.67 | 26 | 77 | * |
| SM 601 | Samson Co., Ltd | 56.65 | 38.35 | 0.68 | 32 | 74 | * |
| SM 771 | Samson Co., Ltd | 60.02 | 36.82 | 0.61 | 38 | 75 | * |
| SM 881 | Samson Co., Ltd | 62.17 | 39.97 | 0.64 | 40 | 75 | * |
| SM 901 | Samson Co., Ltd | 62.98 | 62.98 | 1.00 | 42 | 75 | * |

* - not determined because of high floater content.

Fine expanded perlite products typically have a median particle size of 40 μm or less. The production of fine, expanded perlite products of a controlled particle size distribution having low wet density has been difficult due to the characteristics of expanded perlite and the limitations of existing commercial mineral milling equipment. For example, when unexpanded perlite ore is crushed and screened to a size finer than approximately 54 micrometers, and is then expanded, it forms virtually 100% microspheres (sometimes referred to as microbubbles), a form of floaters, which are hereinafter referred to as expanded perlite microspheres. As a result, fine, low wet density perlite products containing a low percentage of floaters are not generally produced by expanding finely milled ore. Conventional perlite products that are fine and relatively lower in floater content are produced by one of two methods: (i) expanding perlite to a coarser size than desired and milling the expanded product to the desired size; or (ii) recovering a small percentage of the by-product fines produced during the milling of coarser products in a fines recovery circuit.

When a coarse expanded perlite product is milled by conventional means, the wet density of the product increases substantially. In addition, existing commercial milling and classifying equipment is designed for much denser materials and does not provide good control of the particle size of milled light density materials, such as expanded perlite. Fine expanded perlite with typically somewhat lighter wet density can be produced by recovering by-product fines from a conventional perlite milling operation, but the quality control of these products is difficult, yields are low, and perlite products with controlled particle size distribution are not generally produced.

There is a need for improved perlite products with controlled particle size distribution.

SUMMARY OF THE INVENTION

An expanded perlite product having a controlled particle size distribution is provided, wherein the ratio of the standard deviation of particle size distribution to the median particle size is less than 0.63; and wherein the median particle size is less than 50 microns.

In the expanded perlite product, for example, the ratio of the standard deviation of particle size distribution to the median particle size is less than 0.60; less than 0.58; or less than 0.55. The expanded perlite product has, for example, a wet density less than 50 pounds per cubic foot; less than 40 pounds per cubic foot; less than 35 pounds per cubic foot; less than 30 pounds per cubic foot; less than 25 pounds per cubic foot; or less than 20 pounds per cubic foot.

The expanded perlite product has, for example, a floater content of less than 10 percent by volume; a floater content of less than 5 percent by volume; a floater content of less than 2.5 percent by volume; or a floater content of less than 2 percent by volume. The expanded perlite product has, for example, a blue light brightness greater than 80; greater than 82; greater than 83; or greater than 85.

The expanded perlite product has, for example, a Hegman fineness greater than 1.0; greater than 2.0; greater than 3.0; greater than 4.0; greater than 5.0; or greater than 6.0.

Processes for the preparation of an expanded perlite also are provided, for example, comprising using air classification equipment to effect both milling and air classification, thereby to obtain the expanded perlite product. The expanded perlite product also can be obtained, for example, by centrifugal sieving.

Further provided are filters, insulating materials, fillers, horticultural media, hydroponic media, and chemical carriers comprising the expanded perlite product. Also provided are methods of separating components from a solution, comprising filtering a solution comprising the components through a filter comprising the expanded perlite products.

MODES FOR CARRYING OUT THE INVENTION

Figure 1:
FIG. 1 is a scanning electron micrograph of the expanded perlite product of Example 10, showing the intricate cellular structure of this perlite product.

Provided is a perlite product having controlled particle size distribution. In one embodiment, there is provided an expanded perlite product having a low ratio of standard deviation of particle size distribution to median particle size (for example, less than 0.63) and low median particle size (for example, less than 50 microns).

In a further embodiment, the perlite product is characterized by low floater content (for example, less than 10 percent by volume), high blue light brightness (for example, greater than 80), and/or high Hegman fineness (for example, greater than 1.0). The perlite product advantageously can retain the intricate and cellular characteristics of the feed material, while also having controlled particle size distribution, low floater content, high blue light brightness, thereby permitting much greater utility in both filtration and filler applications.
Perlite Improved perlite products with controlled particle size distribution are provided, as well as methods of making, and methods of use thereof. The improved perlite product with controlled particle size distribution is derived from the expanded natural glass, perlite. The perlite product is useful in a variety of filtration and functional filler applications. The intricate porous and cellular structure of the siliceous perlite product promotes its usefulness for the physical entrapment of particles in filtration processes, and also for modifying properties of various materials when added as a functional filler.

The perlite product disclosed herein is derived from perlite ore, which belongs to the class of natural glasses. The term "natural glass" is used herein the conventional sense and refers to natural glasses, commonly referred to as volcanic glasses, which are formed by the rapid cooling of siliceous magma or lava. Most natural glasses are chemically equivalent to rhyolite. Natural glasses which are chemically equivalent to trachyte, dacite, andesite, latite, and basalt are known but are less common. The term "obsidian" is generally applied to dark, most often black, massive natural glasses that are rich in silica (i.e., $SiO_2$). Obsidian glasses may be classified into subcategories according to their silica content, with rhyolitic obsidians (containing typically about 73% $SiO_2$ by weight) as the most common (Berry et al., 1983).

Perlite ore is a hydrated natural glass containing typically about 72–75% $SiO_2$, 12–14% $Al_2O_3$, 0.5–2% $Fe_2O_3$, 3–5 % $Na_2O$, 4–5% $K_2O$, 0.4–1.5% $CaO$ (by weight), and small concentrations of other metallic elements. Perlite ore is distinguished from other natural glasses by a higher content (2–10% by weight) of chemically bonded water, the presence of a vitreous, pearly luster, and characteristic concentric or arcuate onion skin-like (i.e., perlitic) fractures.

Perlite products may be prepared by methods disclosed herein which may include milling, screening, and thermal expansion. The perlite products can possess commercially valuable physical properties such as high porosity, low bulk density, and chemical inertness. Depending on the quality of the perlite ore and the method of processing, expanded perlite products can be used as filter aids, lightweight insulating materials, filler materials, horticultural and hydroponic media, and chemical carriers.

The processing of perlite can include comminution of the ore (crushing and grinding), screening, thermal expansion, milling, and air size separation of the expanded material to meet the specification of the finished product and other methods known in the art. For example, perlite ore is crushed, ground, and separated to a predetermined particle size range (e.g., passing 30 mesh), then the separated material is heated in air at a temperature of 870–1100° C. in an expansion furnace (cf. Neuschotz, 1947; Zoradi, 1952), where the simultaneous softening of the glass and vaporization of contained water leads to rapid expansion of glass particles to form a frothy glass material with a bulk volume up to 20 times that of the unexpanded ore. The expanded perlite is then separated to meet the size specification of the final product.

Expanded perlite includes one or more cells, or parts of cells, in which a cell is essentially a void space partially or entirely surrounded by walls of glass, usually formed from expansion of gases when the glass is in a softened state. The presence of gas-filled or vacuous cells in a given volume of glass results in lower centrifuged wet density than for the same volume of solid glass. If cells are closed and air is entrapped, the particles of perlite may float on liquid. Fracturing of perlite, for example, by milling, can create an intricate cellular structure that retains the characteristic of low wet density and also provides useful features for filtration and functional filler applications. However, excessive milling can degrade intricate cellular structures, leading to increased centrifuged wet density while diminishing the desired function obtained from structural features.

The expanded perlite products can be used in a variety of filtration applications. The term "filtration" is used herein in the conventional sense and refers to the removal of particulate matter from a fluid in which the particulate matter is suspended. An exemplary filtration process is one which comprises the step of passing the fluid through a filter aid material supported on a septum (e.g., mesh screen, membrane, or pad).

The intricate cellular structure of expanded perlite is particularly effective for the physical entrapment of particles in filtration processes. The perlite products can be applied to a septum to improve clarity and increase flow rate in filtration processes, in a step sometimes referred to as "precoating." Perlite products are also can be added directly to a fluid as it is being filtered to reduce the loading of undesirable particulate at the septum while maintaining a designed liquid flow rate, in a step often referred to as "body feeding". Depending on particular separation involved, the perlite products may be used in precoating, body feeding, or both. The perlite products, especially those which are surface treated, also may provide preselected properties during filtration that can further enhance clarification or purification of a fluid.

The expanded perlite products can thus be used to separate components, especially particulate matter from solutions, fluids, and fluid suspensions. For example, solid particulate matter from fermentation process solutions may include cells, cell debris, protein aggregates, and other components that can be separated from the remaining solutions, thus clarifying these solutions.

The intricate and cellular structure of perlite products also provides them with commercially valuable filler properties. For example, the expanded perlite products disclosed herein may be used as insulating fillers, resin fillers, and in the manufacture of textured coatings.

The particle size can be preselected for filter aid and filler applications.

Particle size effects result from the average size, the top size, and the size distribution. For a filter aid of moderate permeability, the preferred average size of the improved perlite product is around 20–40 microns, the size distribution is preferably between 3–150 microns, and the top size is preferably around 80–150 microns. For use in a typical flat latex paint, the preferred average size of the improved perlite product is around 20–30 microns, the size distribution is preferably between 3–150 microns, and the top size is preferably around 80–150 microns. For use in a typical low gloss or semi-gloss latex paint, the preferred average size of the improved perlite product is around 14–18 microns, the size distribution is preferably between 2–80 microns, and the top size is preferably around 60–80 microns.

The improved perlite product with controlled particle size distribution of the present invention retains the intricate cellular structure unique to perlite, as shown in FIG. 1, which is a a scanning electron micrograph of the expanded perlite product of Example 10, but has controlled particle size distribution, low floater content and high blue light brightness, thereby permitting much greater utility, particularly as filter aid or filler products.

Using methods disclosed herein, commercially available equipment designed to classify but not to mill minerals of normal densities may be used for both milling and classifying expanded perlite to thereby produce the improved perlite products with controlled particle size distribution of the present invention. The products so made are superior in many applications to existing products, and the production process is economically attractive because a high yield of the desired product is obtained.

In one embodiment, an improved perlite product is provided with controlled particle size distribution, as defined by a ratio of the standard deviation of particle size distribution to the median particle size, less than 0.63, and a median particle size less than 50 microns. In another embodiment, the ratio of the standard deviation of particle size distribution to the median particle size is less than 0.60, for example, less than 0.58, or less than 0.55.

In another embodiment, the improved perlite product with controlled particle size distribution has a wet density not greater than 50 lb/ft$^3$; not greater than 40 lb/ft3;

not greater than 35 lb/ft$^3$; not greater than 30 lb/ft3; not greater than 25 lb/ft$^3$; or in one preferred embodiment, not greater than 20 lb/ft$^3$.

In another embodiment, the improved perlite product with controlled particle size distribution is further characterized by having a blue light brightness greater than 80; greater than 82; greater than 83; or in one preferred embodiment, greater than 85.

In another preferred embodiment, the improved perlite product with controlled particle size distribution has a floater content less than 10 percent by volume; less than 5 percent by volume; less than 2.5 percent by volume; or in one preferred embodiment, less than 2 percent by volume.

In another embodiment, the improved perlite product with controlled particle size distribution has a ratio of the standard deviation of particle size distribution to the median particle size of less than 0.63 and with a Hegman fineness greater than 1.0; a Hegman fineness greater than 2.0; a Hegman fineness greater than 3.0; a Hegman fineness greater than 4.0; a Hegman fineness greater than 5.0; or, in one preferred embodiment, a Hegman fineness greater than 6.0.

Another aspect of the present invention comprises a method of preparing the improved perlite product with controlled particle size distribution using air classification equipment to effect both milling and air classification.

Still another aspect of the present invention comprises a method of preparing the improved perlite product with controlled particle size distribution by centrifugal sieving.

A. METHODS FOR PREPARING THE IMPROVED PERLITE GLASS PRODUCT WITH CONTROLLED PARTICLE SIZE DISTRIBUTION

As described above, the perlite product with controlled particle size distribution has a defined particle size distribution and retains the intricate and cellular characteristics of the feed material. The improved perlite product with controlled particle size distribution can be prepared by several methods.

One preferred method of preparing the improved perlite product of the present invention is by air classification on a classifier equipped with high speed classifier wheel. Surprisingly, this method not only removes the coarse particles from the feed materials but also mills the feed material in a controlled manner, resulting in the improved perlite product with controlled particle size distribution.

Commercially available materials may be used as feed material. For example, milled expanded perlite, such as Harborlite® 2000, and expanded microspheres made from unexpanded perlite ores, such as Harborlite® PA4000 (from Harborlite Corporation, Vicksburg, Mich.), are useful feed materials.

The feed material may be classified on commercially available air classifiers equipped with high speed classifier wheel. For example, a lab scale Alpine™ 50 ATP classifier (Hosokawa Micron Powder Systems, Summit, N.J.) or a large scale Alpine™ 200 ATP classifier equipped with a top feeding system (Hosokawa Alpine Aktiengesellchaft, Augsburg, Germany) may be used for the classification of milled expanded perlite, such as Harborlite® 2000. These classifiers mainly consist of a horizontally mounted high speed classifying wheel and a classifying air outlet. The classifying air injected into the machine base flows inwards through the classifying wheel and discharges the fine material, whereas the coarse particles rejected by the classifying wheel leave the classifier through the coarse material outlet. Parameters such as classifier wheel speed and air flow pressure may be optimized to achieve desired products. Examples of typical parameters for the 50 ATP classifier include: classifier wheel speed from 6000 rpm to 22000 rpm and air flow pressure from 8.0 to 15.0 mBar. Examples of typical parameters for the 200 ATP classifier include: classifier wheel speed from 3500 rpm to 6000 rpm and total air flow from 900 to 950 $m^3/h$. The fine fraction collected in the cyclone is the product and coarse fraction collected in the separator is a by-product or waste.

Another preferred method of preparing the product of the present invention is by careful sieving of the feed materials. For example, a KEK model K1350 centrifugal sifter (Kemutec Inc, Bristol, Pa.) is used for removing particles larger than 250 mesh (53 $\mu$m) from Harborlite® 800 feed (Harborlite Corporation, Vicksburg, Mich.).

Other possible methods of preparing the product of the present invention also include milling through a fixed gap mill, such as a roller mill, and wet classification techniques such as sedimentation, which separates suspended solid particles from a liquid by gravity settling, and hydrocycloning, which uses centrifugal action to classify particles in a liquid media.

The perlite product with controlled particle size distribution may be further modified to enhance its performance in specific applications. For example, its surfaces may be treated with acids or complexing agents to reduce the concentration of soluble substances. The perlite product with controlled particle size distribution may be leached, for example, by methods appropriate for natural glasses (Palm, 1999). Such methods include, but are not limited to, leaching at ambient or elevated temperatures in the presence of such substances as sulfuric acid (i.e., $H_2SO_4$), hydrochloric acid (i.e., HCl), nitric acid (i.e., HNO3), phosphoric acid (i.e., $H_3PO_4$), acetic acid (i.e., $CH_3COOH$), citric acid (i.e., $C_6H_3O_7.H_2O$), or ethylenedinitrilotetraacetic acid (i.e., "EDTA").

The perlite product with controlled particle size distribution may also be modified by silanization to render the surfaces either more hydrophobic or hydrophilic using the methods appropriate for silicate minerals (Moreland, 1975; Sample, 1981). For example, the perlite product with controlled particle size distribution can be placed in a plastic vessel, and a small quantity of dimethyldichlorosilane (i.e., $SiCl_2(CH_3)_2$) or hexadimethylsilazane (i.e: $(CH_3)_3Si$—NH—$Si(CH_3)_3$) added to the vessel. Reaction is allowed to take place at the surface in the vapor phase over a 24 hr period, resulting in more hydrophobic products. Such products have applications in compositions used in chromatography, for example, and also when used in conjunction with other hydrophobic materials for improved mechanical performance, for example, in applications involving hydrocarbons and oils, and also to provide reinforcement in plastics and other polymers.

Similarly, the perlite product with controlled particle size distribution can be reacted, for example, by suspending it in a solution containing 10% (w/v) aminopropyltriethoxysilane (i.e., $C_9H_{23}NO_3Si$) in water, refluxing at 70° C. for 3 hr, filtering the mixture, and drying the remaining solids to obtain more hydrophilic products. Such products have applications in compositions used in chromatography, for example, especially when used in conjunction with aqueous systems for improved mechanical performance, and to permit further derivatization of the product, having converted terminal hydroxyl (i.e., —OH) functional groups at the surface of the perlite product with controlled particle size distribution to aminopropyl groups (i.e., —$(CH_2)_3NH_2$). The hydrophilic (e.g., silanized) modified perlite product with controlled particle size distribution can be further reacted to bind an organic compound, for example, a protein; the improved perlite product with controlled particle size distribution thereby serves as a support for the immobilization of the organic compound. So modified, the product has utility in applications such as affinity chromatography and biochemical purification.

The surfaces of the improved perlite product with controlled particle size distribution may also be etched with etchants appropriate for glasses, including, but not limited to, hydrofluoric acid (i.e., HF), ammonium bifluoride (i.e., $NH_4F.HF$), or sodium hydroxide (i.e., NaOH). Surface etching may enhance subsequent treatment processes; for example, etching may increase the number of terminal hydroxyl groups, which in turn may subsequently react with various silanes.

A number of other reactions pertaining to the surfaces of glasses have been previously described (Hermanson, 1992). However, derivatizations of the improved perlite product with controlled particle size distribution which offer specific properties yield products with improved efficacy.

Modifications and variations of the invention as hereinbefore set forth can be made without departing from the spirit and scope thereof.

B. METHODS FOR CHARACTERIZING THE IMPROVED PERLITE PRODUCT WITH CONTROLLED PARTICLE SIZE DISTRIBUTION

1. Particle Size Distribution

The particle size distribution of samples is determined in accordance with the phenomenon of scattered light from a laser beam projected through a stream of particles. The amount and direction of light scattered by the particles is measured by an optical detector array and then analyzed by a microcomputer which calculates the size distribution of the particles in the sample stream. Data reported may be collected on a Leeds and Northrup Microtrac X100 laser particle size analyzer (Leeds and Northrup, North Wales, Pa.). This instrument can determine particle size distribution over a particle size range from 0.12 to 704 microns. Median particle size ($d_{50}$) is defined as that size for which 50 percent of the volume that is smaller than the indicated size. Rather than providing an indication of the statistical error about the mean of multiple measurements, the standard deviation (sd) as used herein describes a specified width of the measured particle size distribution. In particular, it subtracts the size of particles comprising the finest 16% of the volume from the size that comprises 84% of the volume, and divides that number by 2. Both values may be calculated from the instrument's algorithms, and are discussed in detail in the instrument's documentation (Leeds and Northrup, Operator's Manual, 1993). The ratio of standard deviation to median particle size shows the relative tightness of the particle size distribution.

The improved perlite product with controlled particle size distribution in one embodiment has a ratio of the standard deviation of particle size to the median particle size less than 0.63 (for example in the range of from 0.50 to 0.63) and a median particle size less than 50 microns (usually in the range of from 30 to 50 microns). In another embodiment, the ratio of the standard deviation of particle size to the median particle size is less than 0.60 (for example, in the range of 0.50 to 0.60); the ratio of the standard deviation of particle size to the median particle size is less than 0.58 (for example, in the range of 0.50 to 0.58); or the ratio of the standard deviation of particle size to the median particle size is less than 0.55 (for example, in the range of 0.50 to 0.55). The median particle size of the conventional perlite products with the ratio of the standard deviation of particle size to the median particle size less than 0.63 is greater than 50 microns. Compared to conventional products, the present invention consists of particles of reduced median particle size with a narrow particle size distribution.

2. Floater Content

The floater content of samples in one embodiment is determined on a volume basis. The loose product is introduced into a calibrated 100 mL container until it overflows. The excess is carefully removed with a steel straight edge. The sample is then introduced a 250 ml graduated glass cylinder using a plastic funnel. The graduated glass cylinder is filled with water up to the 200 mL level and is shaken thoroughly. Additional water is filled to 250 mL level. After resting for 5 minutes, the volume of the floater particles can be read in units of mL and the floater content in volume percentage can thus be calculated:

Floater content (percent by volume)=(Reading of floater volume in mL/100 mL container volume)×100.

For example, the reading of floater particles for Example 12 in Table II, below, was 8 mL. The floater content for this product is thus calculated to be 8 percent by volume.

The improved perlite product with controlled particle size distribution preferably has a floater content less than 10 percent by volume (usually in the range of from 5 to 10 percent by volume), more preferably has a floater content less than 5 percent by volume (usually in the range of from 2.5 to 5 percent by volume), still more preferably has a floater content of less than 2.5 percent by volume (usually in the range of 2 to 2.5 percent by volume), still more preferably has a floater content of less than 2 percent by volume (usually in the range of 0 to 2 percent by volume). Compared with the floater content of conventional perlite products which are typically greater than 20 percent by volume, the improved perlite product with controlled particle size distribution has a significantly lower floater content.

3. Blue Light Brightness

The preferred method for determining the blue light brightness of the samples in the present invention uses calculation from Hunter scale color data collected on a Spectro/plus Spectrophotometer (Color and Appearance Technology, Inc., Princeton, N.J.). A krypton-filled incandescent lamp is used as the light source. The instrument is calibrated according to the manufacturer's instructions using a highly polished black glass standard and a factory calibrated white opal glass standard. A plastic plate having a depressing machined into it is filled with sample, which is then compressed with a smooth-faced plate using a circular pressing motion. The smooth-faced plate is carefully removed to insure an even, unmarred surface. The sample is then placed under the instrument's sample aperture for the measurements.

The improved perlite product with controlled particle size distribution for example has a blue light brightness greater than 80 (e.g., in the range from 80 to 82); has a blue light brightness greater than 82 (e.g., in the range from 82 to 83); has a blue light brightness greater than 83 (e.g., in the range from 83 to 85), or has a blue light brightness greater than 85 (e.g., in the range from 85 to 88).

4. Wet Density

The preferred method for determining the packed density of the samples in the present invention is specifically by measurement of the centrifuged wet density, also referred to herein as wet density. A sample of known weight between 1.00 and 2.00 g is placed in a calibrated 15 ml centrifuge tube to which deionized water is added to make up a volume of approximately 10 ml. The mixture is shaken thoroughly until all of the sample is wetted and there is no dry powder remaining. Additional deionized water is added around the top of the centrifuge tube to rinse down any mixture adhering to the side of the tube from shaking. The tube is centrifuged for 5 min at 2500 rpm on an IEC Centra® MP-4R centrifuge, equipped with a Model 221 swinging bucket rotor (International Equipment Company, Needham Heights, Mass.). Following centrifugation, the tube is carefully removed so as not to disturb the solids and the level (i.e., volume) of the settled matter is measured in $cm^3$. The centrifuged wet density of powder is readily calculated by dividing the sample weight by the measured volume. Typically, centrifuged wet density is reported in units of $lb/ft^3$ or in units of $g/cm^3$; the conversion factor for these units is 1 $lb/ft^3$~0.01602 $g/cm^3$.

An expanded perlite product having an excessive floater content can interfere with an accurate determination of centrifuged wet density. Especially when the floater content of an expanded perlite product is 10% or greater, a significant quantity of the material refuses to pack in the bottom of the calibrated centrifuge tube, thus not allowing a reasonably accurate measurement to be taken.

The improved perlite product with controlled particle size distribution has a wet density for example less than 50 lb/ft$^3$ (e.g., in the range from 11 to 50 lb/ft$^3$); less than 40 lb/ft$^3$ (e.g., in the range from 11 to 40 lb/ft$^3$); less than 30 lb/ft$^3$ (e.g., in the range from II to 30 lb/ft$^3$); less than 25 lb/ft$^3$ (e.g., in the range from 11 to 25 lb/ft$^3$); or, for example, less than 20 lb/ft$^3$ (e.g., in the range from 11 to 20 lb/ft$^3$). The improved perlite product with controlled particle size distribution may be prepared with still lower centrifuged wet density.

5. Hegman Fineness Measurements

The fineness of grind or the degree of the dispersion of the fillers in a pigment-vehicle system such as paint is measured by Hegman fineness. The test is based on a standard method of the American Society of Testing and Materials (ASTM D-1210). In a preferred method, 80 g of lettering white oil based high gloss enamel paint (C.P.E.—A Division of Courtaulds Coatings Inc., Gary, Ind.) are mixed with 20 ml mineral spirits in a ½-pint paint can using a shaft stirrer. After adding 8.5 g sample, the mixture is kept stirring for 5 minutes for dispersion. An alternative sample preparation is to mix motor oil and sample at about a 10:1 ratio by weight in a watch glass with the spatula and read the Hegman value as hereinafter described.

A small amount of dispersed sample is placed in the deep end of the path of the Hegman fineness gage (Precision Gage & Tool Co., Dayton, Ohio). By using a steel draw-down blade/scraper, the material is then drawn down the length of the path toward the shallow end of the gage with a uniform, brisk motion. The fineness reading, in Hegman units (0–8) is obtained by observing the point where the material first shows a definite speckled pattern. Typical fineness patterns described in the ASTM D 1210 procedure can be used for comparison.

In one embodiment, the improved expanded perlite product with controlled particle size distribution has a ratio of the standard deviation of particle size distribution to the median particle size of less than 0.65 and with a Hegman fineness greater than 1.0, with a Hegman fineness greater than 2.0, with a Hegman fineness greater than 3.0, with a Hegman fineness greater than 4.0, with a Hegman fineness greater than 5.0, or with a Hegman fineness greater than 6.0.

6. Flatting Efficiency (85° Sheen) Measurements

The flatting efficiency of the paint fillers is determined by measuring their ability to reduce the sheen, sometimes referred to as specular gloss, of high gloss paint. The test is based on a standard method of the American Society for Testing and Materials (ASTM D 523), and is usually performed concurrently with the Hegman test. The sample is mixed in paint using the same procedure used for determining Hegman fineness. Occasionally, a super white high gloss Latex enamel paint (The Sherwin-Williams Company, Cleveland, Ohio) can be used to replace the oil based paint. In this case, no solvent is used for mixing. The mixed paint sample is poured on a Leneta chart (The Leneta Company, Mahwah, N.J.) at the top of the white area to form a 2" diameter spot. A Bird applicator gage (Precision Gage & Tool Co., Dayton, Ohio) with a 0.003" gap is placed on the chart above the paint spot with the gap down and the side of the blade with the longer taper facing the paint spot. A film of the paint is formed on the Leneta chart by drawing down the Bird applicator with a smooth, rapid, downward motion. The paint is allowed to air dry at room temperature, and the sheen reading is then taken on the dried paint chart using a calibrated Glossgard® II 85° glossmeter (Pacific Scientific, Silver Springs, Md.).

C. METHODS OF USING THE IMPROVED PERLITE PRODUCTS WITH CONTROLLED PARTICLE SIZE DISTRIBUTION

The improved expanded perlite product with controlled particle size distribution can be used in a manner analogous to the currently available natural glass products, including, for example, in filtration (e.g, as a filter aid), and as a filler.

The intricate cellular structure unique to these glass materials is particularly effective for the physical entrapment of particles in filtration processes. The improved perlite product with controlled particle size distribution of the present invention can be applied to a septum (i.e., used in "precoating") to improve clarity and increase flow rate in filtration processes. They can also be added directly to a fluid as it is being filtered to reduce the loading of undesirable particulate at the septum while maintaining a designed liquid flow rate (i.e., used in "body feeding").

Examples of fluid and/or fluid suspensions which may be filtered using the improved perlite product with controlled particle size distribution of the present invention include: water, beverages (for example, beer, fruit juice), botanical extracts (for example, sugar solutions, vegetable oils, flavors, antibiotics), animal extracts (for example, fats, oils), fermentation broths (for example, cell suspensions and cell cultures, including, for example, yeast extracts, bacterial broths, mammalian cell cultures), blood or blood products, vaccines, or chemicals (for example, organic and inorganic chemicals including, for example, solvents such as methanol, and solutions such as aqueous sodium chloride).

The expanded perlite product with controlled particle size distribution may be used in conjunction with a wide variety of filtration and separation devices that are designed to use particulate media, including those devices which use principles of gravity, pressure, vacuum, or other applied forces to encourage passage of liquid through the media.

Further, mixtures of the perlite product with controlled particle size distribution with other kinds of filter media or filtration-related materials, such as cellulose or diatomite, are possible. Such mixtures are sometimes used to modify filtration performance to achieve a desired result in terms of clarity or throughput. Also, adsorbents such as silica gel, tannin, or activated carbon may be added in some filtrations to achieve auxiliary performance, usually to obtain specific chemical properties in the filtrate.

Such mixtures may also be used in loose form, or in some cases may be consolidated into forms such as filter sheets, pads, or cartridges, in which a resin is usually added as a binder to hold the mixture firmly together. These find utility in compact or specially constrained filtration applications.

The improved expanded perlite product with controlled particle size distribution is also useful as a component in composite media, such as thermally sintered media comprised of a functional filtration component and a matrix component (cf. Palm, 1999).

Certain applications may gain additional benefit from using the improved perlite product with controlled particle size distribution that has been modified or derivatized, for example, by leaching with acid or complexing agents, by etching, by silanization, or by coupling organic molecules to a silanized functionality.

Following filtration, the improved expanded perlite product with controlled particle size distribution is inevitably contaminated with turbidity that has been removed from the liquid being filtered. The improved perlite product with controlled particle size distribution can be chemically regenerated by applying an appropriate solvent that is chemically compatible. Such a solvent will usually dissolve the turbidity while leaving the improved perlite product with controlled particle size distribution intact. Often, the turbidity entrained from the filtration of many foods and beverages is organic in nature, and can be dissolved in dilute solutions of sodium hydroxide (i.e., caustic soda lye, NaOH). Turbidity obtained from filtration of petroleums, petrochemicals, coal tars, or from similar substances can often be dissolved in aliphatic or aromatic hydrocarbons, which do not attack the improved perlite product with controlled particle size distribution. Once the turbidity has been removed, the improved perlite product with controlled particle size distribution can again be used for filtration, offering greater economy of use.

Alternatively, many kinds of turbidity can also be eliminated by heating to a temperature hot enough to combust the turbidity to gases, but moderating the heat so as to avoid distortion of the intricate structure of the improved perlite product with controlled particle size distribution, thus allowing thermal regeneration of the improved perlite product with controlled particle size distribution. The usefulness of this technique depends in part on the composition of both the turbidity and the improved perlite product with controlled particle size distribution. The turbidity should be relatively low in ash content, and the improved perlite product with controlled particle size distribution should undergo little reaction with either the turbidity or its ash. For an improved perlite product with controlled particle size distribution, a temperature of approximately 750° C. (1380° F.) is a typical maximum limit. Still other methods of regeneration are also possible.

The improved expanded perlite product with controlled particle size distribution may also be sterilized using a sterilizing agent such as steam, chlorine, iodine, chlorinated compounds or iodinated compounds useful for disinfection, ozone, or ionizing radiation. These may be applied prior to filtration in order to effect sterile filtration, or following filtration to disinfect entrained turbidity that may be pathogenic or biohazardous.

The improved perlite product with controlled particle size distribution of the present invention can also be used as a functional filler. Functional fillers are typically added, that is, "compounded," to other substances to make a material mixture that may commonly be referred to as "filled." The means of compounding usually allows one or more specific functional properties to be imparted to the filled material. These functional properties are often physical in nature, and may involve various mechanical or optical effects. Occasionally, chemical functionality is imparted, and this may also alter electrical properties. The improved perlite product with controlled particle size distribution is effective when compounded in filled materials so as to impart the functionality of the improved perlite product to the filled material.

Examples of such applications include use of the improved expanded perlite product with controlled particle size distribution as a flatting agent or as an aid to improve scrubbability in paints and coatings; as an antiblock agent in polymers, such as polyethylene or polypropylene film; as a functional filler in paper, including as a drainage aid and in stickies pacification in paper manufacture; as a reinforcing agent in plastics, including nylon, polypropylene, phenolics and brake pad manufacture; and as a filler for adhesive, sealant, and joint compounds.

The improved perlite product with controlled particle size distribution is also useful in abrasive, polishing, buffing, or cleansing formulations, wherein it may impart an abrasive property. Further, the improved perlite product with controlled particle size distribution is useful in ceramics and ceramic mixtures, including tile, asphalt, concrete, mortar, plaster, stucco, grout, and aggregate, especially to decrease the density of these materials. The improved perlite product with controlled particle size distribution may be applied to other architectural products, including roofing shingles or sheets, architectural siding, flooring, or acoustical tile with similar efficacy.

The most common method of adding the improved perlite product with controlled particle size distribution to prepare a filled material is to blend it into a mixture at a concentration needed to impart the desired level of a property. For example, to reinforce nylon, the improved perlite product with controlled particle size distribution may be added to a controlled-temperature twin-screw extruder to which unfilled nylon is being fed and made molten. The improved perlite product with controlled particle size distribution is fed into the extruder through a hopper and uniformly blends in to the nylon. The mixture emerges from the extruder and is cooled. Then, for example, the mixture can be further compression molded or injection molded into useful shapes, and the molded pieces of filled nylon will be suitably reinforced compared with the unfilled nylon.

Because of the intricate porosity of the improved perlite product with controlled particle size distribution, is it useful as an absorbent in many applications. Its absorbent properties also make it useful as a carrier of other substances.

The aforementioned applications describe the utility of the improved perlite product with controlled particle size distribution, but many other applications may be envisioned for the improved perlite product with controlled particle size distribution.

EXAMPLES

The improved perlite products with controlled particle size distribution of the present invention and methods for their preparation are described in the following examples, which are offered by way of illustration and not by way of limitation.

Particle size data were collected on a Leeds and Northrup Microtrac X100 laser particle size analyzer (Leeds and Northrup, North Wales, Pa.).

Examples 1 to 13 were prepared using a lab scale Alpine™ 50 ATP classifier. A commercially available expanded perlite product, Harborlite® 2000, was used as the feed material. This feed material had a particle size distribution (PSD) from 21 $\mu$m ($d_{10}$) to 112 $\mu$m ($d_{90}$). Classification tests were conducted at a classifier wheel speed from 6000 rpm to 22000 rpm and air flow pressure from 8.0 to 15.0 mBar. The fine fraction was then collected as the improved perlite product with controlled particle size distribution.

Examples 14 to 17 were prepared on a large scale Alpine™ 200 ATP classifier equipped with a top feeding system. A commercially available expanded perlite product, Harborlite® 2000, was used as feed material. Classification tests were conducted at a classifier wheel speed from 3500 rpm to 6000 rpm and total air flow from 900 to 950 m³/h. The fine fraction was then collected as the improved perlite products with controlled particle size distribution.

Example 18 was prepared on a KEK model K1350 centrifugal sifter using a 250 mesh (63 μm) screen. A commercially available expanded perlite product, Harborlite® 800, was used as feed material.

Examples 19 to 21 were prepared on a lab scale Alpine™ 50 ATP classifier. An expanded perlite microsphere product made from Harborlite® PA4000 was used as feed material. The expanded perlite microsphere product made from Harborlite® PA4000 used as a feed material had a particle size distribution (PSD) from 21 μm ($d_{10}$) to 121 μm ($d_{90}$).

Tests to determine the particle size distribution, floater content, and blue light brightness were carried out according to the methods described above. The results for the improved perlite product with controlled particle size distribution are shown in Table II. The improved perlite product with controlled particle size distribution of these examples had a ratio of standard deviation of particle size distribution to the median particle size less than 0.63, median particle size less than 50 microns, floater content less than 10 percent by volume, blue light brightness more than 80 and wet density less than 50 lb/ft$^3$.

TABLE II

| Examples | Feed | Classifier | Classifier Wheel Speed (rpm) | $d_{50}$ (μm) | sd (μm) | sd/$d_{50}$ | Floater (volume %) | Blue light brightness | Wet Density (lb/ft$^3$) |
|---|---|---|---|---|---|---|---|---|---|
| Example 1 | Harborlite® 2000 | 50 ATP | 22000 | 7.90 | 4.91 | 0.62 | <2 | 85 | 40 |
| Example 2 | Harborlite® 2000 | 50 ATP | 21000 | 8.62 | 5.04 | 0.58 | <2 | 87 | 38 |
| Example 3 | Harborlite® 2000 | 50 ATP | 20000 | 9.51 | 5.63 | 0.59 | <2 | 88 | 37 |
| Example 4 | Harborlite® 2000 | 50 ATP | 19000 | 10.43 | 6.12 | 0.59 | <2 | 88 | 37 |
| Example 5 | Harborlite® 2000 | 50 ATP | 18000 | 11.20 | 6.60 | 0.59 | <2 | 87 | 29 |
| Example 6 | Harborlite® 2000 | 50 ATP | 17000 | 14.17 | 7.82 | 0.55 | <2 | 85 | 23 |
| Example 7 | Harborlite® 2000 | 50 ATP | 16000 | 15.23 | 8.43 | 0.55 | <2 | 85 | 24 |
| Example 8 | Harborlite® 2000 | 50 ATP | 14000 | 18.79 | 10.25 | 0.55 | <2 | 82 | 21 |
| Example 9 | Harborlite® 2000 | 50 ATP | 12000 | 22.00 | 11.91 | 0.54 | <2 | 81 | 20 |
| Example 10 | Harborlite® 2000 | 50 ATP | 10000 | 26.85 | 15.25 | 0.57 | <2 | 82 | 18 |
| Example 11 | Harborlite® 2000 | 50 ATP | 8000 | 32.21 | 19.48 | 0.60 | 6 | 81 | 17 |
| Example 12 | Harborlite® 2000 | 50 ATP | 7000 | 36.09 | 21.99 | 0.61 | 8 | 81 | 17 |
| Example 13 | Harborlite® 2000 | 50 ATP | 6000 | 39.05 | 24.73 | 0.63 | 8 | 80 | 16 |
| Example 14 | Harborlite® 2000 | 200 ATP | 6000 | 13.95 | 8.13 | 0.58 | <2 | 82 | 24 |
| Example 15 | Harborlite® 2000 | 200 ATP | 5100 | 18.21 | 10.26 | 0.56 | <2 | 82 | 19 |
| Example 16 | Harborlite® 2000 | 200 ATP | 4700 | 20.55 | 11.47 | 0.56 | <2 | 81 | 20 |
| Example 17 | Harborlite® 2000 | 200 ATP | 3500 | 32.60 | 18.65 | 0.57 | 4 | 81 | 14 |
| Example 18 | Harborlite® 800 | K1350 CS | NA | 28.01 | 16.31 | 0.58 | <2 | 84 | 14 |
| Example 19 | Expanded Harborlite® PA 4000 | 50 ATP | 18200 | 10.73 | 6.80 | 0.63 | <2 | 88 | 21 |
| Example 20 | Expanded Harborlite® PA 4000 | 50 ATP | 15000 | 14.04 | 8.05 | 0.57 | <2 | 86 | 18 |
| Example 21 | Expanded Harborlite® PA 4000 | 50 ATP | 14000 | 15.49 | 8.58 | 0.55 | <2 | 85 | 18 |

Classification tests were conducted at the classifier wheel speed from 14000 rpm to 18200 rpm and air flow pressure from 8.0 to 15.0 mBar. The fine fraction product was then collected as the perlite product with controlled particle size distribution. The light density of the classified expanded perlite microsphere products indicates that the perlite product with controlled particle size distribution made from this feed has intricate and cellular characteristics similar to the products prepared from Harborlite® 2000 feed.

For suitability in paint filler applications, Hegman fineness and flatting efficiency (85° sheen) were determined for the improved perlite product according to the methods described above. The results for both the improved perlite product and the most commonly used products in these applications today are listed in the Tables III and IV. The Hegman fineness for the commercial fine perlite products is also listed for comparison. As can be readily seen, the improved perlite product examples exceed the flatting efficiency (in both oil-based paint and Latex paint) for conventional diatomite products in both low Hegman fineness and high Hegman fineness product classes. Table III also shows that the Hegman fineness for most commercial fine perlite products is around 0. This indicates that the improved perlite product with controlled particle size distribution has superior top size control, offering the advantage of comparatively smooth-surfaced paint and coating films, and smoothness in related applications.

TABLE III

| Examples | Hegman in oil[a] |
|---|---|
| Harborlite ® 200 | 0.5 |
| Harborlite ® 200Z | 0.5 |
| Harborlite ® 300C | 0.5 |
| Harborlite ® 400 | 0.0 |
| Dicalite ™ 416 | 0.0 |
| Europerlita ™ 75 | 0.0 |
| SM 101 | 2.0 |
| SM 201 | 0.0 |
| Topco ™ #54 | 0.0 |
| Example 1 | 6.0 |
| Example 2 | 6.0 |
| Example 3 | 6.0 |
| Example 4 | 5.5 |
| Example 5 | 5.0 |
| Example 6 | 4.0 |
| Example 7 | 4.0 |
| Example 8 | 3.5 |
| Example 9 | 2.3 |
| Celite ® 281 | 2.0 |
| Example 10 | 1.0 |
| Example 16 | 2.0 |
| Celite ® 499 | 4.0 |
| Example 14 | 4.0 |

[a]In Pennzoil SAE 10W-30 motor oil

TABLE IV

| Examples | Paint | Loading (g) | 85° Sheen |
|---|---|---|---|
| Example 9 | Oil based | 8.5 | 2.1 |
| Celite ® 281 | Oil based | 8.5 | 3.2 |
| Celite ® 281 | Latex | 4.25 | 13.5 |
| Example 10 | Latex | 2.0 | 26.2 |
| Example 10 | Latex | 3.0 | 9.8 |
| Example 10 | Latex | 4.0 | 4.4 |
| Example 16 | Latex | 2.0 | 37.5 |
| Example 16 | Latex | 3.0 | 19.0 |
| Example 16 | Latex | 4.0 | 8.5 |
| Celite ® 499 | Latex | 4.0 | 25.0 |
| Example 14 | Latex | 4.0 | 26.4 |

The disclosures of the publications, patents, and published patent specifications referenced below are hereby incorporated by reference into the present disclosure in their entirety.

American Society for Testing and Materials, ASTM Designation D 1210–79 (Reapproved 1988), *Standard Test Method for Fineness of Dispersion of Pigment-Vehicle Systems*.

American Society for Testing and Materials, ASTM Designation D 523–89 (Reapproved 1994), *Standard Test Method for Specular Gloss*.

Bear, J. (1988), *Dynamics of Fluids in Porous Media* (New York: Dover Publications, Inc.), pp. 161–176.

Berry, L. G. et al. (1983), *Mineralogy* (Second Edition) (New York: Freeman and Co.); pp. 540–542.

Breese, R. O. Y. and Barker, J. M. (1994), in *Industrial Minerals and Rocks* (Littleton, Colo.: Society for Mining, Metallurgy, and Exploration, Inc.), pp. 735–749.

Cain, C. W. Jr. (1984), in *Encyclopedia of Chemical Processing and Design* (New York: Marcel Dekker), pp. 348–372.

Carman, P. (1937), *Trans. Institution of Chem. Eng.*, pp. 150–166.

Kadey, F. L. Jr. (1983), in *Industrial Minerals and Rocks* (Littleton, Colo.: Society for Mining, Metallurgy, and Exploration, Inc.), pp. 677–708.

Heertjes, P. et al. (1949), *Recueil*, Vol. 68, pp. 361–383.

Heertjes, P. et al. (1966), in *Solid-Liquid Separation* (London: Her Majesty's Stationery Office), pp. 37–43.

Hernanson, G. T. et al. (1992), *Immobilized Affinity Ligand Techniques* (San Diego: Academic Press Inc.).

Keifer, J. (1991), *Brauwelt International*, IV/1991, pp. 300–309.

Leeds and Northrup (1993, North Wales, Pa.), Microtrac® X-100 & SRA150 Operator's Manual 179551, Rev. B.

Moreland, J. E. (1975), U.S. Pat. No. 3,915,735.

Neuschotz, R. (1947), U.S. Pat. No. 2,431,884.

Norden, H. et al. (1994), *Separation Science and Technology*, Vol. 29(10), pp. 1319–1334.

Ostreicher, E. A. (1986), U.S. Pat. No. 4,617,128.

Palm, S. K. (1998), U.S. Pat. No. 5,776,353.

Palm, S. K. (1999), U.S. Pat. No. 5,908,561.

Ruth, B. (1946), *Industrial and Engineering Chemistry*, Vol. 38(6), pp. 564–571.

Sample, T. E., Jr. and Horn, J. M. (1981), U.S. Pat. No. 4,260,498.

Sperry, D. (1916), *Metallurgical and Chemical Eng.*, Vol. XV(4), pp. 198–203.

Stein, H. A. et al. (1955) California Journal of Mines and Geology, State of California Division of Mines; Vol. 51, No. 2; pp. 105–116.

Stowe, G. B. (1991), U.S. Pat. No. 5,035,804.

Tiller, F., et al. (1953), *Chemical Engineering Progress*, Vol.49(9), pp.467–479.

Tiller, F., et al. (1962), A.I.Ch.E. Journal, Vol. 8(4), pp. 445–449.

Tiller, F., et al. (1964), A.I.Ch.E. Journal, Vol. 10(1), pp. 61–67.

Trivedi, N. C. and Hagemeyer, R. W. (1994), in *Industrial Minerals and Rocks* (Littleton, Colo.: Society for Mining, Metallurgy, and Exploration, Inc.), pp. 483–495.

Zoradi, E. D. (1952), U.S. Pat. No. 2,602,782.

What is claimed is:

1. An expanded perlite product having a controlled particle size distribution;
   wherein the ratio of the standard deviation of particle size distribution to the median particle size is less than 0.63; and
   wherein the median particle size is less than 50 microns.

2. The expanded perlite product of claim 1, wherein the ratio of the standard deviation of particle size distribution to the median particle size is less than 0.60.

3. The expanded perlite product of 2, wherein the ratio of the standard deviation of particle size distribution to the median particle size is less than 0.58.

4. The expanded perlite product of claim 3, wherein the ratio of the standard deviation of particle size distribution to the median particle size is less than 0.55.

5. The expanded perlite product of claim 1, wherein the product has a wet density less than 50 pounds per cubic foot.

6. The expanded perlite product of claim 5, wherein the product has a wet density less than 40 pounds per cubic foot.

7. The expanded perlite product of claim 6, wherein the product has a wet density less than 35 pounds per cubic foot.

8. The expanded perlite product of claim 7, wherein said product further has a wet density less than 30 pounds per cubic foot.

9. The expanded perlite product of claim 8, wherein the product has a wet density less than 25 pounds per cubic foot.

10. The expanded perlite product of claim 9, wherein the product has a wet density less than 20 pounds per cubic foot.

11. The expanded perlite product of claim 1, wherein the product has a floater content of less than 10 percent by volume.

12. The expanded perlite product of claim 11, wherein the product has a floater content of less than 5 percent by volume.

13. The expanded perlite product of claim 12, wherein the product has a floater content of less than 2.5 percent by volume.

14. The expanded perlite product of claim 13, wherein the product has a floater content of less than 2 percent by volume.

15. The expanded perlite product of claim 1, wherein the product has a blue light brightness greater than 80.

16. The expanded perlite product of claim 15, wherein the product has a blue light brightness greater than 82.

17. The expanded perlite product of claim 16, wherein the product has a blue light brightness greater than 83.

18. The expanded perlite product of claim 17, wherein the product has a blue light brightness greater than 85.

19. The expanded perlite product of claim 1, wherein the product has a Hegman fineness greater than 1.0.

20. The expanded perlite product of claim 19, wherein the product has a Hegman fineness greater than 2.0.

21. The expanded perlite product of claim 20, wherein the product has a Hegman fineness greater than 3.0.

22. The expanded perlite product of claim 21, wherein the product has a Hegman fineness greater than 4.0.

23. The expanded perlite product of claim 22, wherein the product has a Hegman fineness greater than 5.0.

24. The expanded perlite product of claim 23, wherein the product has a Hegman fineness greater than 6.0.

25. A filter, insulating material, filler, horticultural media, hydroponic media, or chemical carrier comprising the expanded perlite product of claim 1.

26. A method of separating components from a solution, comprising filtering a solution comprising the components through a filter comprising the expanded perlite product of claim 1.

* * * * *